United States Patent [19]

Stoll et al.

[11] Patent Number: 4,762,052

[45] Date of Patent: Aug. 9, 1988

[54] PISTON

[76] Inventors: Kurt Stoll, Lenzhalde 72; Gerhard Hihn, Schurwaldstr. 7, both of D-7300 Esslingen, Fed. Rep. of Germany

[21] Appl. No.: 838,106

[22] Filed: Mar. 10, 1986

[30] Foreign Application Priority Data

Mar. 12, 1985 [DE] Fed. Rep. of Germany ....... 3508686

[51] Int. Cl.⁴ ............................ F16J 1/00; B29C 13/00
[52] U.S. Cl. ......................................... 92/172; 92/250; 264/274
[58] Field of Search ............................ 92/172, 250, 257; 29/156.5 R; 264/274

[56] References Cited

U.S. PATENT DOCUMENTS

| | | |
|---|---|---|
| 3,066,001 | 11/1962 | Zimmerman ................... 92/257 X |
| 3,149,543 | 9/1964 | Naab ................................. 92/250 X |
| 3,626,774 | 12/1971 | Schon ............................... 264/274 X |
| 3,855,029 | 12/1974 | Sabel ............................... 264/274 X |
| 3,983,205 | 9/1976 | Barrett ............................. 264/274 X |

FOREIGN PATENT DOCUMENTS

| | | |
|---|---|---|
| GM1793535 | 6/1959 | Fed. Rep. of Germany . |
| GM7703341 | 7/1977 | Fed. Rep. of Germany . |
| DE3404095 | 6/1986 | Fed. Rep. of Germany . |
| DE2914624 | 6/1986 | Fed. Rep. of Germany . |

Primary Examiner—William E. Wayner
Attorney, Agent, or Firm—McGlew and Tuttle

[57] ABSTRACT

It is a question of a multi-part piston more especially for use in double acting cylinder actuators. The piston has two piston halves that are mounted on a piston rod so as to be symmetrical about a contact surface between them. Each piston half has a metallic inner member with a radial anchoring projection, as for example in the form of a flange. On the inner member there is a molded casing of synthetic resin. Each piston half has a piston seal arranged in a circumferential groove in the outer surface of the casing.

13 Claims, 1 Drawing Sheet

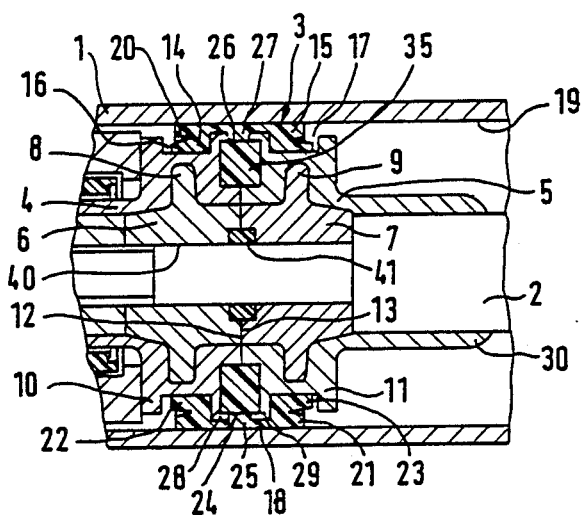

4,762,052

PISTON

BACKGROUND OF THE INVENTION

The invention relates to pistons and more particularly to pistons made up of a plurality of parts with a piston rod for use in double acting cylinders.

A large variety of different forms of such pistons have been proposed in the prior art for use in cylinder actuators such as more especially pneumatic or less frequently hydraulic cylinder actuators. They are however either complicated in structure or involve certain problems for the user in connection with guiding and sealing in the cylinder.

SHORT SUMMARY OF THE PRESENT INVENTION

On the other hand one object of the present invention is to devise a piston of the type in question with a simple structure.

A further object of the invention is to provide such a piston which is simple to produce at a low cost.

A still further aim of the invention is to ensure that the piston is accurately guided in the cylinder and makes satisfactory sealing contact therewith.

In order to achieve these or other objects appearing in the course of the following specification, the piston has two piston halves adapted to be symmetrically mounted on the piston rod and each having a metallic inner member with a radial and for example flange-like, anchoring projection, and a casing body made of resin molded on the inner member, such piston halves each carrying a piston seal which is located in a peripheral groove in the outer surface of the casing body. In this respect the arrangement may be such that the two piston seals abut against each other in the center part of the piston between its axial ends so as to form the cylinder engaging surface of the piston at this position. It is convenient if on its side remote from the respective other piston half each piston seal has an outer sealing lip for contacting the bore of the cylinder and an inner retaining lip in a groove on the outer side of the respective piston half, while on the side thereof facing the other respective piston half it has a guide lip extending in an opposite direction to the sealing lip, such guide lip forming the guide surface with the guide lip of the other piston half. It is particularly expedient in this respect if the free ends of the guide lips of the two piston halves are in each case bent inwards generally at a right angle and are retained between the piston halves, it being possible for example for the bent free ends of the guide lips of the two piston halves to contact each other at their facing surfaces. The piston halves may for example be so designed that in each case one generally radial end surface, i.e. one surface that is transverse in relation to the length direction of the piston, makes contact with the corresponding surface of the other piston half so as to form a contact surface, the design being best so made that such surface between the two piston halves is approximately coplanar with the bent, free ends of the two guide ribs. The piston seals may have the form of a structure with three limbs for example, of which two are parallel to each other and are directed towards the free end, radial surface of the respective piston half, whereas the third piston limb is generally parallel to the other limbs and is directed towards the other piston half with the possibility of designing its free end so as to be generally at a right angle and directed inwards. It is more especially an advantage in this respect if the two piston seals are respectively mounted in a peripheral groove in the axial center part of the associated piston half, where the respective third limbs of the piston seals interlock or snap around onto radial end wall part, delimiting the end surface adjacent to the contact surface, of the respective piston half and at this position form a part of the guide surface and a part of the contact surface.

It will be seen from the above explanations that owing to the symmetry about a radial plane of two identical piston halves there is a simplification of the production and holding stocks of pistons and piston components. Two piston halves may be combined to form a piston for a double acting cylinder actuator or the halves may be used singly as a piston of a single acting cylinder actuator. Lastly, it is possible to make up multiple piston arrangements by using one piston half as a basic modul which is fitted to a suitable number of other moduls in according with requirements. The construction of the piston half a multipart structure with a metallic core and a casing of synthetic resin means that the piston is able to stand up to stresses occurring in operation in an optimum manner, seeing that the core provides the piston member with an optimum degree of strength and withstands axial forces to which the piston is subjected, whereas the plastic material of the casing provides for low-friction engagement with the cylinder bore (i.e. the inner surface of the cylinder wall) and is able to take up transverse forces and moments occurring in operation in an optimum manner. Furthermore, synthetic resin is characterized by low material costs and may be exactly molded at low cost. The joint produced by molding on the inner part of the piston half is permanent and withstands heavy loads. The resin injection technology employed means that manufacturing costs are low. The design and placement of the different seals on the one hand involves the advantage that a particularly satisfactory guiding or running effect is ensured, in addition to the fact that the seal lips are held in place in a very satisfactory and expedient manner and there is a compact connection of these seals with the load bearing part of the piston, while on the other one may be certain of a particularly strong connection with the metallic core of the piston and of the casing made of synthetic resin.

It is possible for the end, remote from the contact surface between the two piston halves, of the casing member to be molded onto a buffer sleeve extending out past the inner member. In the case of this feature, a resin casing is molded around the piston halves as the buffer sleeve which serves to cushion the piston at the end of its stroke so that a combined guiding and damping function is produced with a simple design.

In accordance with another feature of the invention the casing body has annular half grooves at the contact surface between the piston halves so that a detector ring may be mounted with part of it in each of the half grooves. This represents a simple way of accommodating a position detector means in the piston of the invention in a way which makes for simple assembly at a low cost. The detector ring is detected by an electromagnetic unit for sensing the position of the piston.

As part of further developments of the invention, the piston halves are sealed at their contact surface, more especially at the metallic inner member. The inner members may be provided with an axial through hole which becomes wider at the contact surface in the form of half a groove into which a sealing ring may be inserted.

BRIEF DESCRIPTION OF THE DRAWING

In the drawing the reader will be able to see one working example of the invention as viewed from the side and in axial section.

DETAILED ACCOUNT OF EMBODIMENT OF THE INVENTION.

The figure shows the piston 3 in accordance with the invention as used in a double acting pneumatic or possibly hydraulic cylinder actuator 1. The cylinder actuator, with which the piston is employed, is only shown in part. Generally only the piston is to be seen together with the adjacent parts of the piston rod 2 and of the cylinder inasfar as this is necessary for gaining an understanding of the invention. Some of the features of the construction such as the fact that the two axial ends of the cylinder are shut off with suitable cylinder end caps, through which at least one of which the piston rod runs, will be familiar to those in the art and not in need of special mention.

The piston 3 in accordance with the invention is made up of a number of different parts; it consists of the two piston halves 4 and 5 which are mounted on the piston rod 2 so as to symmetrical about a radial plane between them. Each piston half comprises a metallic inner member 6 and 7 with a radial anchoring projection 8 and 9 which may be in the form of a flange and is best made continuous around he inner member. The inner members 6 and 7 are enclosed in a molded-on casing 10 and 11 of synthetic resin as for example a urethane resin. The anchoring projections 8 and 9 are arranged halfway along the axial length of the inner member and may be fashioned with openings into which the resin will then become keyed during the molding process so as to increase the strength of the joint between the resin and the anchoring projection. In this respect the piston halves 4 and 5 are so placed that their respective end surfaces 12 and 13, which are generally radial in direction, are in abutment with each other to form an interface or common contact surface between the two piston halves 4 an 5. At these two radial surfaces in contact with each other it is possible to have interengaging detent means which may for instance be formed on the casing in the form of an axially aligned pin to fit into a axially opposite hole. With the aid of such interengaging locking means it is possible for the two piston halves to be locked together so that it is not possible for them to turned about their common axis in relation to each other. These measures are not illustrated in the figure.

The two casings 10 and 11 made of synthetic resin material of the two piston halves 4 and 5 each bear a piston seal 14 and 15 which is respectively lodged in a circumferential groove 16 and 17 in the outer surface of the casing. These two piston seals 14 and 15 are arranged in the center between the axial ends of the piston are in abutment at this position so that they then jointly form the bore engaging surface of the piston 3. On the side remote from the other piston half, each of the piston seals 14 and 15 has an outer sealing lip 20 and 21 running on the bore 19 of the cylinder and furthermore there is an inner holding lip 22 and 23 located in the groove 16 and 17 on the outer side of the respective piston half, whereas on the side adjacent to the other respective piston half the piston seal has a guide lip 24 and 25 extending in the opposite direction to the sealing lip 20 and 21 and this guide lip 24 or 25 cooperates with the respective other guide lip of the other piston half to form the guide surface 18, the sealing lip 20 and 21 and the guide lip 24 and 25 of each piston half being at an angle of 180° to each other. The result is then that the piston seals 14 and 15 each have the form of a structure with three limbs 20, 22 and 24 or 21, 23 and 25, respectively of which two limbs 20 and 22 or 21 and 23 respectively, are parallel to and within each other and are directed towards the free radial end surfaces of the piston half, whereas the third piston seal limb 24 or 25 is directed so as to be generally parallel to the other limbs and towards the other piston half.

The free ends of the guide lips 24 and 25, respectively, of the two piston halves, are in each case represented as being bent inwards approximately at a right angle as is indicated at 26 and 27, such sections being retained between the parts 28 and 29 of the two piston halves. These angled or bent free ends 26 and 27 of the guide lips 24 and 25 of the two piston halves 4 and 5 have their adjacent surfaces in contact with each other, the design being such that the contact or common interface 12 and 13 between the two piston halves 4 and 5 and the contact surface between the bent free ends 26 and 27 of the two guide lips 24 and 25 are generally coplanar with each other.

On inspecting the drawing it will therefore be seen that the two piston seals 14 and 15 are respectively located in the circumferential groove 16 and 17 halfway along the axial length of the respective piston half 4 and 5 and the respective third limb 24 and 25 of the piston seals fits with an interlocking effect around the end wall part, delimiting the circumferential groove on the end surface adjacent to the contact surface 12 and 13 and respectively forming a part of the guide surface 18 and a part of the interface or contact surface. This contact surface, with is defined by the end-on-end abutment of the two identically construction piston halves, extends in a direction that is perpendicular to the length direction of the piston, that is to say it extends in a radial direction, the piston halves are arranged symmetrically about this contact surface and they represent building blocks or modules which are jointly mounted on one and the same piston rod in order to form the piston of a double acting cylinder actuator.

As already noted, the metallic inner members 6 and 7 of the piston halves are encapsulated in the casing 10 and 11, which is made of synthetic resin material and surrounds the respective inner member at its circumferential outer part so as to interlock with same. The casing is best injection molded onto the respective inner member so that a permanent joint is formed by means of the radial anchoring projection between the metal part and the synthetic resin part. In this respect a buffer sleeve 30 is molded on the end, remote from the contact surface 12 and 13, of the casing 10 and 11. The sleeve 30 projects out past the inner member. On the side of the respective piston halves 4 and 5 remote from the contact surface 12 and 13 this buffer sleeve projects axially in each case beyond the inner member. The buffer sleeves have the function of plunging into axial holes of a corresponding size and shape in the cylinder end caps so as to produce a known buffering or dashpot action owing to the cooperation of such sleeves with the axial holes, that are somewhat larger in size, and corresponding buffer seals to buffer or damp the piston motion. Since this principle is known, no detailed account is given of this feature of the invention, which is only mentioned in passing.

The piston 3 is provided with a detector ring 35, the arrangement being such that the casings 10 and 11 have annular grooves at the contact surface 12 and 13 of the two piston halves 4 and 5, such grooves being designed to each accommodate one half side of the detector ring 35. This detector ring 35 serves as part of a system for ascertaining the position, the speed and/or the acceleration of the piston, it being most convenient for the respective data concerning the piston motion to be sensed magnetically of inductively for example. The respective details of such a system are also known and the feature of the invention that in this respect is new and useful is primarily the arrangement of the detector ring within the piston between the two piston halves.

The piston halves make sealing contact with each other at their contact surfaces 12 and 13, such sealing effect being preferably produced at the metallic inner members, for which purpose an axial through hole 40 in the inner members becomes wider at the contact surface 22 and 13 in the form of half a groove to receive a sealing ring 41. This sealing ring may for instance be made of rubber and be in the form of an O-ring. Furthermore, the sealing lips, that in the present invention are made to be be particularly sturdy and ensure a guiding action while at the same time ensuring the desired sealing effect, may be made of rubber or synthetic resin such as urethane resin.

It is to be noted in addition that the invention is not limited to a piston made up of two piston halves as explained hereinbefore and it would be possible for one single piston half to be used as such, more particularly in a single acting cylinder actuator, and on the other hand a plurality of piston halves might be modularly joined together in order to produce larger multi-part pistons.

We claim:

1. A multi part piston comprising a piston rod, two piston halves mounted on said piston rod so as to be symmetrical about a plane between them which is radial with respect to said rod, each such piston half comprising a metallic inner member with radial anchoring projection, a molded resin casing on the inner member, and a piston seal on said molded casing in a circumferential groove in an outer surface of said casing, wherein each piston seal comprises an outer sealing lip on the side of the piston half remote from the respective other piston half, said outer sealing lip being positioned to run on the bore a cylinder, and an inner retainer lip located on the outer side of the respective piston half, whereas on the side opposite to the sealing lip such piston seal has a guide lip extending in a direction opposite to that of the sealing lip, said guide lip forming the said bore-engaging surface with the guide lip of the other piston half.

2. The piston as claimed in claim 1 wherein said piston seals abut at a position halfway along the axial length of the piston in the direction of said piston rod and here form a cylinder bore engaging surface for the piston.

3. The piston as claimed in claim 1 wherein the said sealing lip and the said guide lip of each respective piston half are at an angle of essentially 180° to each other.

4. The piston as claimed in claim 1 wherein said guide lips on the two piston halves have free ends which are angled inwards essentially at a right angle and are retained between parts of the two piston halves.

5. The piston as claimed in claim 4 wherein the angled free ends of the guide lips of the two piston halves have mutually adjacent parts that are in contact with each other.

6. The piston as claimed in claim 5 wherein said piston halves each have an end surface that is essentially radial in relation to said rod and is in contact with the respective corresponding end surface on the other piston half to form a contact surface.

7. The piston as claimed in claim 6 wherein said contact surface between the two piston halves and a surface at which the two inwardly angled free ends of the guide lips adjoin are generally coplanar.

8. The piston as claimed in claim 7 wherein said piston seals respectively have the form of a structure with three limbs of which two are parallel to and placed within each other and are directed towards a free outer radial end of the respective piston seal, whereas the third limb on each piston half is generally parallel to the other said limbs and is directed towards the other respective piston half with a free end thereof bent inwards essentially at a right angle.

9. The piston as claimed in claim 8 wherein the two piston seals are each mounted in a circumferential groove in the respective piston half halfway between axial ends of the piston half and the respective third limbs of the piston seals fit around the said groove in the manner of a detent at the end surface, delimiting the end side adjacent the said contact surface, of the respective piston half and form a part of the guide surface and a part of the contact surface.

10. The piston as claimed in claim 9 wherein a buffer sleeve is formed extending axially beyond the inner member at the end of the casing remote from the contact surface.

11. The piston as claimed in claim 10 wherein the casings have adjoining annular half grooves at the contact surface of the piston halves, said piston further comprising a detector ring so mounted in said annular groove that one half thereof is in a different one of said half grooves.

12. The piston as claimed in claim 11 wherein said piston halves make sealing contact with each other at their contact surface at the metallic inner member.

13. The piston as claimed in claim 12 wherein the inner members each have an axial through hole which widens at the contact surface in the form of half a groove to receive a sealing ring.

* * * * *